2,738,361

PREPARATION OF IRON CATALYSTS FOR CARBON MONOXIDE HYDROGENATION

Herbert Kölbel, Homberg (Lower Rhine), and Ernst Ruschenburg, Utfort, Kreis Moers, Germany, assignors to Rheinpreussen Aktiengesellschaft für Bergbau und Chemie, Homberg (Lower Rhine), Germany, a German corporation No Drawing. Application October 3, 1951,
Serial No. 249,614

6 Claims. (Cl. 260—449.6)

This invention relates to improvements in the preparation of iron catalysts for carbon monoxide hydrogenation. It more particularly relates to a method for preparing iron catalysts for carbon monoxide hydrogenation with the use of natural earth alkali compounds as precipitating and carrying agents in solid form.

It is known in the art that natural minerals containing alkaline compounds such as magnesium, calcium, strontium or barium oxides, hydroxides or carbonates can be advantageously used as precipitants for iron salt solutions for the preparation of iron catalysts for carbon monoxide hydrogenation. These natural minerals may even be used when mixed with each other in solid, finely ground form. The alkaline earth passing in solution during the precipitation may be left entirely or partially in the catalyst depending on whether an equivalent quantity or a smaller quantity of alkali is used for its reprecipitation.

When using minerals of the same deposits as well as of different deposits, there have been obtained catalysts with a relatively low and unsatisfactory activity. The reasons for the frequent production of these low activity catalysts were heretofore unknown and the total analysis of the minerals with regard to the alkaline earth contents and admixtures shows only non-essential deviations from each other.

One object of this invention is the preparation of iron catalysts with high activity with the use of natural earth alkali compounds as precipitating and carrying agents in solid form. This and still further objects will become apparent from the following description:

It has now been surprisingly found after extensive investigation that the important factor in catalyst activity is not so much the percentage of accompanying substances in the mineral as in the form in which they are chemically present. Silica ($SiO_2$) has been found according to the invention to be an essential accompanying substance of the minerals. If the $SiO_2$ is in the form of a silicate such as aluminum or magnesium silicate, which decomposes in the iron salt solution to a considerable extent at the precipitation temperatures used, a catalyst having a relatively low activity will be obtained. If, on the other hand, the $SiO_2$ is present in a difficultly soluble form, for example, as such, a highly reactive catalyst will be obtained. Decomposable silicates include the feldspars and preferably the disintegration products from these minerals, such as kaolin, clay and loam, which are either obtained as natural impurities when working up the earth alkali minerals deposits or are embedded in these minerals. A crude earth alkali mineral which is free or almost free from detrimental silicates, containing less than 1% of weight of decomposable silicates, is suitable for direct use in the preparation of catalyst.

In most cases a high $Al_2O_3$ content of the mineral indicates the presence of admixtures which are detrimental to the activity. With aluminum oxide contents in excess of 1% by weight in the crude earth alkali mineral detrimental i. e. decomposable, silicates are normally expected to be present.

By sintering the mineral, it is possible in many cases to obtain a substantial improvement of the catalytic properties of the catalysts prepared therewith. The sintering operation should be carried out at temperatures ranging from 550° C. to 1500° C., preferably at 900° C.–1000° C., over periods of between 3 and 10 hours, and the higher the content in detrimental silicates is, the higher should be the temperature used. Sintering is normally carried out in shaft kilns such as are used for the production of burnt lime.

If the sintering alone is not sufficient to provide the desired catalytic acitvity, it has been found advantageous to add to the mineral before sintering suitable admixtures such as, for example, iron nitrate salt or its solution in quantities, for example, of 1 to 3% $Fe(NO_3)_3$ referred to $CO_2$-free mineral. Other suitable admixtures are, for instance, iron oxide, hydroxides of iron or iron oxyhydrates, which should be added in quantities equivalent to the alumina present in the crude mineral. Any excess of these admixtures up to the double amount will do no harm.

Instead of using admixtures, the same effect may be attained by mere sintering if, after sintering operation, the sintered mineral is sifted to remove the fines before the sintered mineral is used in preparing the catalyst.

Instead of sintering with or without adding the admixtures, an earth alkali mineral containing more than 1% of detrimental silicates can also be made suitable by sifting, thereby removing the detrimental silicates which, when working the mineral deposits, have been principally reduced to the smaller particle sizes owing to their lesser hardness.

In accordance with the invention catalysts with high activity are obtained by the precipitation of iron salt solutions with minerals of the alkaline earth group in solid, finely divided form which do not contain in excess of 1% by weight of silicates which are decomposable in the precipitation solution.

As is known, iron precipitation catalysts for hydrocarbon synthesis from carbon monoxide and hydrogen, generally require additions of alkali in order to develop their activity to a sufficient extent. With an increasing alkali content an increase in the average chain length of the hydrocarbon molecules produced results. Alkali-free iron precipitation catalysts in the temperature range of sufficient carbon monoxide conversion show an increased or even predominant methane formation and carbon deposition which, of course, is highly undesirable. It has been found that the highly active catalyst produced in accordance with the present invention may be used for hydrocarbon synthesis from carbon monoxide and hydrogen without the use of alkali. This alkali-free conversion which is advantageously effected at a temperature slightly above temperatures used with weakly alkaline catalysts in accordance with the invention, occurs without any increase in methane formation or carbon deposition. Low boiling hydrocarbons are predominantly obtained and there is practically no solid paraffin in the synthesis products.

As mentioned above, the alkali-free catalysts, in accordance with the invention, require reaction temperatures of, say, 250° C.–265° C. while temperatures of, say, 245° C. are necessary when using a weakly alkalined catalyst according to the invention. In this connection, reference is made to Examples 1 and 6 which follow. In accordance with the addition of activators, such as copper, the temperature range of the synthesis reaction, when using alkali-free catalysts according to the invention, may be varied by about 10° C. in both directions.

The invention may be illustrated by the following examples, without of course being restricted to them. The percentages are by weight unless stated otherwise. In these examples, the catalysts are prepared as follows: 100 parts by weight of iron (applied in the form of the nitrate) in 10% aqueous solution are heated to approx. 95° C. and gradually mixed by stirring with 80 parts by weight of sintered dolomite (particle size below 0.5 mm.). The iron solution may contain an addition of preferably up to 7.5% copper in the nitrate form, referred to iron. Then a soda solution containing 100 to 110 grams per liter, about 95° C. hot, is added as quickly as possible while stirring, and the temperature is briefly increased to 100° C., after which the mixture is immediately filtered and washed with distilled water to largely separate it from any nitrate ions. The proper amount of soda necessary for the precipitation of the metals from their nitrate solutions is found by separate titration of the iron or, respectively, the iron-and-copper solution with the intended soda solution until the litmus bluing is just constant. If an alkaline catalyst is to be prepared, the contact mass, which should be filtered as dry as possible, is converted to a uniform paste by adding a solution of, for instance, potassium carbonate in little water, and it is preferable to use up to 3% of potassium carbonate, referred to the iron applied. For making the catalyst alkaline, the potassium carbonate may be replaced by other alkali compounds, such as sodium carbonate, potassium permanganate, alkali silicates such as water-glass, alkali phosphates, also alkali hydroxides, alkali bicarbonates as well as alkali salts of organic acids, such as alkali acetates. The alkali amounts should preferably be between 0.5 and 5% by weight, referred to the iron applied and calculated as $K_2O$. At the drying operation, temperatures in excess of 100° C. in the catalyst mass are avoided.

Example 1

To prepare the catalyst, a dolomite of the following composition (in percent by weight) is used: 29.82% CaO, 18.10% MgO, 43.30% $CO_2$, 0.97% $Al_2O_3$, 0.79% $Fe_2O_3$, 7.02% insoluble residue, essentially $SiO_2$. The crude dolomite is sintered at 1000° C. and subsequently reduced to a particle size of less than 0.5 mm. The sintered dolomite has the following composition (% by weight): 57.70% CaO, 40.07% MgO, 0.20% $CO_2$, 0.23% $Al_2O_3$, 1.03% $Fe_2O_3$, 0.77% $SiO_2$.

Over the catalyst prepared in the manner as described above, which is activated with 3% copper and alkalized with 1% $K_2CO_3$, a synthesis gas free of carbon dioxide, containing 10% nitrogen and containing carbon monoxide and hydrogen in a volume ratio of 1:2, is passed at normal pressure and at a temperature of 245° C. The quantity of synthesis gas applied per hour is 4 liters per 25 grams of catalyst. With a gas contraction of 36–38%, a carbon monoxide conversion of 90–95% was obtained.

Example 2

To prepare the catalyst, a crude dolomite containing more than 1% of decomposable silicates was used. Its composition was as follows: 32.5% CaO, 21.80% MgO, 41.20% $CO_2$, 2.20% $Al_2O_3$, 0.70% $Fe_2O_3$, 1% insoluble residue (essentially $SiO_2$). Sintering was also done at 1000° C. The sintered dolomite had the following composition: 55.18% CaO, 37.63% MgO, 0.46% $CO_2$, 1.54% $Al_2O_3$, 0.22% $Fe_2O_3$, 5.17% insoluble residue.

Maintaining identical synthesis conditions as in Example 1, a carbon monoxide conversion of 30–35% was obtained with a gas contraction of 11–13%.

Example 3

To prepare the catalyst, the same crude dolomite as in Example 2 was used, dry-mixed with 5% iron in form of $Fe(NO_3)_3$ and sintered at 1000° C., whereby a sintered dolomite of the following composition was obtained: 55.48% CaO, 38.38% MgO, 0.25% $CO_2$, 0.60% $Al_2O_3$, 1.41% $Fe_2O_3$ and 3.76% insoluble residue.

Maintaining identical synthesis conditions as in Example 1, a carbon monoxide conversion of 90–95% was obtained with a gas contraction of 33–36%.

Example 4

To prepare the catalyst, the same crude dolomite as in Example 2 was used. The crude dolomite was sintered at 1000° C. and sifted upon sintering to remove the particle size below 10 mms. The sifted sintered dolomite had the following composition: 58.10% CaO, 40.45% MgO, 0.20% $CO_2$, 0.23% $Al_2O_3$, 0.77% $Fe_2O_3$, 0.25% insoluble residue.

Maintaining identical synthesis conditions as in Example 1, a carbon monoxide conversion of 90–95% was obtained with a gas contraction of 29–31%.

Example 5

To carry out the synthesis, the same catalyst as in Example 1 was used and operated with a synthesis gas rich in carbon monoxide, containing carbon monoxide and hydrogen in a volume ratio of 1.6:1, at a pressure of 10 atm. and with a space velocity of 100 liters of synthesis gas per liter of catalyst per hour. Inert gases contained in the synthesis gas used were: 6 percent by volume of carbon dioxide and 5 percent by volume of nitrogen. A carbon monoxide conversion of 93% was obtained with a gas contraction of 51.5% when using a synthesis temperature of 240–250° C. during an operating period of three months. Hydrocarbons obtained amounted to 190 g./C. B. M. N. T. P. $CO+H_2$.

Example 6

The catalyst used in this example was prepared as described in Example 1, but without making the catalyst alkaline with $K_2CO_3$.

This alkali-free catalyst was operated at a slightly higher temperature of 250–265° C. while the other synthesis conditions of Example 1 were maintained. During an operating period of three months and with a gas contraction of 52%, a carbon monoxide conversion of 93% was obtained. The total amount of the hydrocarbons produced was 190 grams per C. B. M. N. T. P. $CO+H_2$.

We claim:

1. In the preparation of iron precipitation catalysts for hydrocarbon synthesis from carbon monoxide and hydrogen which comprises treatment of an aqueous solution of an iron-soluble salt with a mineral precipitant containing an alkaline earth metal compound and a silicate the improvement comprising: sintering the alkaline earth containing mineral, sifting the sintered mineral and eliminating fines of a particle size below 10 millimeters to reduce the content of silicate decomposable during precipitation to an amount in the mineral not in excess of 1 per cent by weight; precipitating the iron salt solution with the mineral thus prepared; and recovering the resulting precipitated iron catalyst.

2. In the preparation of iron precipitation catalysts for hydrocarbon synthesis from carbon monoxide and hydrogen which comprises treatment of an aqueous solution of an iron soluble salt with a mineral precipitant containing an alkaline earth metal compound and a silicate, the improvement comprising sifting the alkaline earth-containing mineral and eliminating fines of a particle size below 10 millimeters to remove silicate which is decomposable during precipitation and to reduce the decomposable silicate content to an amount not in excess of 1 per cent by weight, precipitating the iron salt solution with the resulting alkaline earth containing mineral in a finely divided form and recovering the precipitated iron catalyst.

3. In the preparation of iron precipitation catalysts for hydrocarbon synthesis from carbon monoxide and hydrogen which comprises treatment with an aqueous solution of a soluble iron salt with a mineral precipitant containing an alkaline earth metal compound and a silicate, the improvement for employing alkaline earth minerals containing detrimental decomposable silicates comprising mixing the alkaline earth containing mineral with oxygen compounds of iron in quantities equivalent to the amount of the alumina contained in said mineral before sintering, reducing the amount of silicate decomposable during precipitation to a quantity not exceeding 1 per cent by weight by sintering the mineral containing a decomposable silicate, and then precipitating an iron salt solution with the alkaline earth containing mineral thus prepared.

4. In the preparation of iron precipitation catalysts for hydrocarbon synthesis from carbon monoxide and hydrogen which comprises treatment with an aqueous solution of a soluble iron salt with a mineral precipitant containing an alkaline earth metal compound and a silicate, the improvement for employing alkaline earth minerals containing detrimental decomposable silicates comprising mixing the alkaline earth containing mineral with an oxygen compound of iron in a quantity not in excess of two times the amount of alumina contained in said mineral before sintering, reducing the amount of silicate decomposable during the precipitation to a quantity not exceeding 1 per cent by weight by sintering the mineral containing a decomposable silicate, and then precipitating an iron salt solution with the alkaline earth containing mineral thus prepared.

5. In the preparation of iron precipitation catalysts for hydrocarbon synthesis from carbon monoxide and hydrogen which comprises treatment with an aqueous solution of a soluble iron salt with a mineral precipitant containing an alkaline earth metal compound and a silicate, the improvement for employing alkaline earth minerals containing detrimental decomposable silicates comprising mixing the alkaline earth containing mineral with a compound selected from the group consisting of nitrates, oxides, hydroxides and oxyhydrates of iron in a quantity not in excess of two times the amount of alumina contained in said mineral before sintering, reducing the amount of silicate decomposable during precipitation to a quantity not exceeding 1 per cent by weight by sintering the mineral containing a decomposable silicate, and then precipitating an iron salt solution with the alkaline earth containing mineral thus prepared.

6. In the preparation of iron precipitation catalysts for hydrocarbon synthesis from carbon monoxide and hydrogen which comprises treatment with an aqueous solution of a soluble iron salt with a mineral precipitant containing an alkaline earth metal compound and a silicate, the improvement for employing alkaline earth minerals containing detrimental decomposable silicates comprising mixing the alkaline earth containing mineral with from about 1 to 3 per cent ferric nitrate based on a carbon dioxide-free mineral before sintering, reducing the amount of silicate decomposable during precipitation to a quantity not exceeding 1 per cent by weight by sintering the mineral containing a decomposable silicate, and then precipitating an iron salt solution with the alkaline earth containing mineral thus prepared.

References Cited in the file of this patent

UNITED STATES PATENTS

| | | |
|---|---|---|
| 2,283,173 | Bates | May 19, 1942 |
| 2,383,643 | Fulton et al. | Aug. 28, 1945 |
| 2,444,035 | Corson et al. | June 29, 1948 |

OTHER REFERENCES

U. S. Naval Technical Mission Report, No. 248–45, September 1945, pp. 38 to 42.

Hall et al.: "Additional Information Concerning the Fischer-Tropsch Process and its Products," PB Report 93, 498 (BIOS Final Report No. 1,722, Item No. 22) 1948, pages 120–121.